United States Patent [19]

Robinson

[11] 4,289,215

[45] Sep. 15, 1981

[54] DETACHABLE STEP

[75] Inventor: David M. Robinson, Margate, Fla.

[73] Assignee: Goldblatt Tool Company, Kansas City, Kans.

[21] Appl. No.: 22,309

[22] Filed: Mar. 20, 1979

[51] Int. Cl.[3] .............................................. F16M 11/00

[52] U.S. Cl. ....................................... 182/92; 182/228; 182/184

[58] Field of Search .................. 182/92, 228, 181-186, 182/224-226

[56] References Cited

U.S. PATENT DOCUMENTS

| | | | |
|---|---|---|---|
| 1,116,073 | 11/1914 | Johnson et al. | 182/228 |
| 1,677,362 | 7/1928 | Oberdorfer | 182/181 |
| 3,357,719 | 12/1967 | McCrea | 182/92 |
| 3,464,518 | 9/1969 | Stelovich | 182/184 |
| 3,698,512 | 10/1972 | Cebular | 182/228 |

FOREIGN PATENT DOCUMENTS

| | | | |
|---|---|---|---|
| 661463 | 3/1965 | Belgium | 182/178 |
| 1105070 | 3/1968 | United Kingdom | 182/178 |

*Primary Examiner*—Reinaldo P. Machado
*Attorney, Agent, or Firm*—Lowe, Kokjer, Kircher, Wharton & Bowman

[57] ABSTRACT

The present invention relates to a new and improved detachable step for a sawhorse or the like, which can be easily assembled and disassembled without the use of tools. The detachable step is supported between a pair of side rails. A pin may be used to secure the step to the saw horse.

1 Claim, 7 Drawing Figures

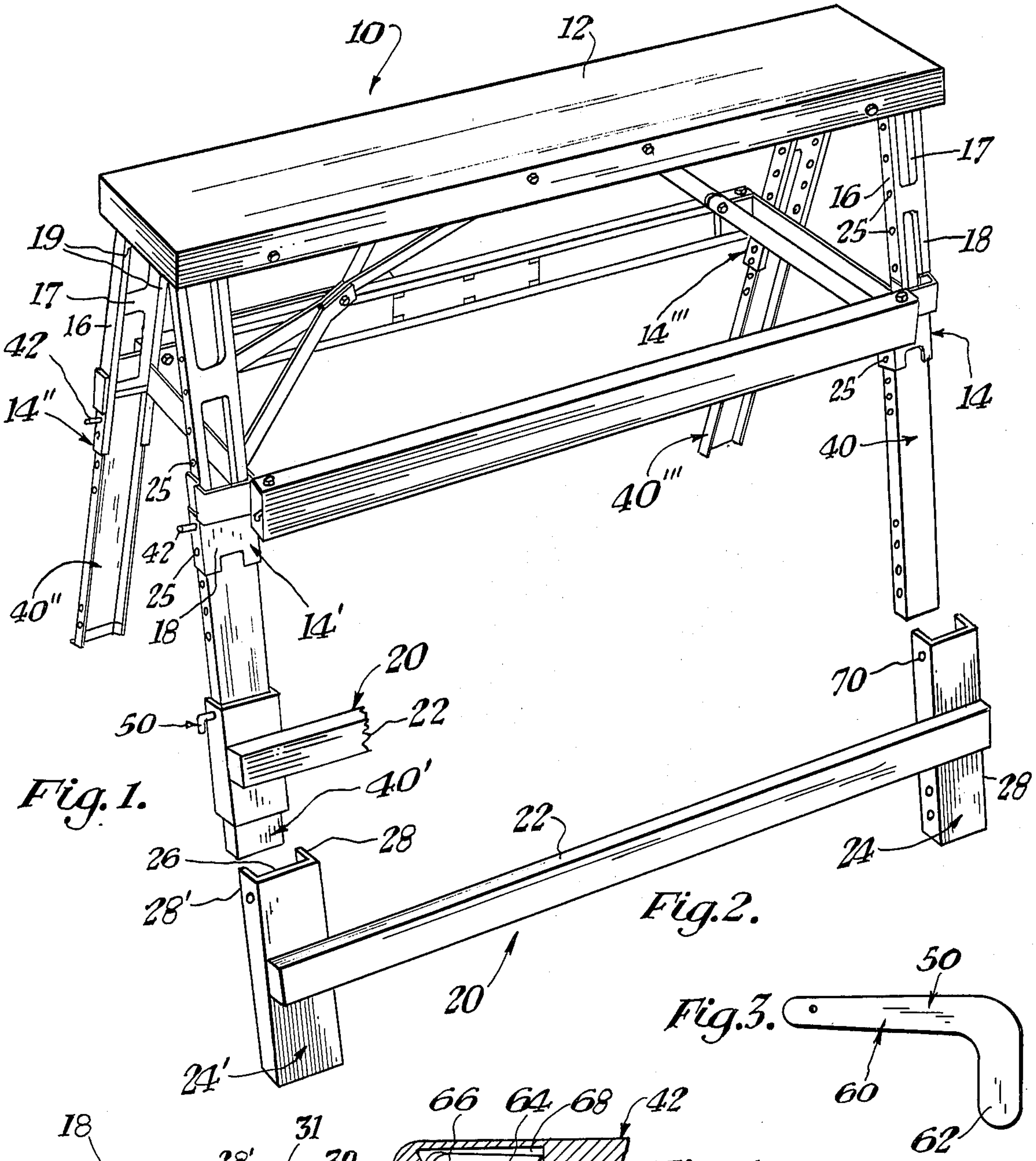
Fig.1.
Fig.2.
Fig.3.
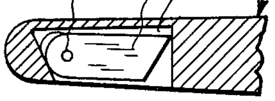
Fig.4A.
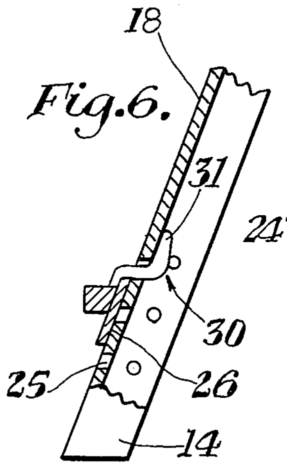
Fig.6.
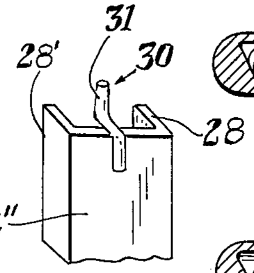
Fig.5.
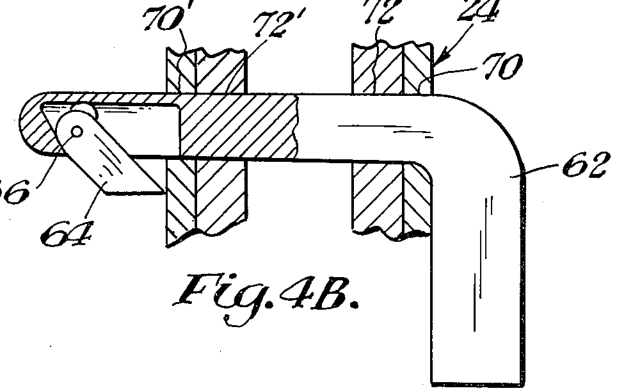
Fig.4B.

DETACHABLE STEP

BACKGROUND OF THE INVENTION

This invention relates to a new and improved step for a saw horse, and more particularly to a detachable step fastenable to the side rails of a saw horse having adjustable leg members.

In the past, steps have been secured to the side pieces of ladders and saw horses by permanent attaching means such as nails, rivets, and bolts as illustrated in U.S. Pat. Nos. 1,519,283 and 2,300,018. Thus, it has been necessary to have a number of tools to assemble a strong and sturdy step device. Disassembly of the device also required tools or the device had to be transported while fully assembled.

SUMMARY OF THE INVENTION

The present invention relates to a new and improved detachable step for a saw horse with adjustable legs or the like, which can be easily assembled and disassembled without the use of tools. The step comprises a transverse rung disposed between a pair of perpendicular support members. A pin may be attached or connected to the step for fastening the support members of the step to a side rail or legs of the saw horse.

It is an object of this invention to provide an inexpensive yet strong and easily detachable step means for use with a saw horse having vertically adjustable legs.

It is another object of this invention to provide an easily detachable step means for a saw horse with adjustable legs which is fastened to the saw horse or the like by moveable pins.

It is a further object of this invention to provide a step means for a saw horse with vertically adjustable legs which can be removeably affixed to the saw horse without using tools.

In accordance with these and other objects which will be apparent hereinafter, the instant invention will now be described with particular reference to the accompanying drawings.

BRIEF DESCRIPTION OF THE DRAWINGS

FIG. 1 is a perspective view of a saw horse embodying a partial view of the present invention.

FIG. 2 is a perspective view of the present invention.

FIG. 3 is a side view of a drop pin.

FIG. 4*a* is a partial cross-section of the drop pin.

FIG. 4*b* is a partial side view of FIG. 3 partially in cross-section showing the drop pin in the saw horse leg.

FIG. 5 is a partial prospective view of another connecting pin.

FIG. 6 is a side view in partial section of the end of FIG. 5 showing the saw horse leg member.

DESCRIPTION OF THE PREFERRED EMBODIMENT

Referring now in detail to the drawings, wherein an embodiment of the invention is shown, and referring particularly to FIG. 1, a saw horse with adjustable legs, generally designated as numeral 10 is illustrated with the new and improved detachable step 20 of the present invention secured thereto.

The saw horse 10 consists of a generally flat rectangular top 12 supported by four legs 14, 14', 14'', and 14''' near the corners. The legs are vertically adjustable in height to permit a pair of saw horses to be used in supporting a scaffold type platform of various heights. Each leg is a channel member having parallel side faces 16, a front face 18, and a rear face 17. Flange members 19 project inward from each distal edge of sides 16. The legs may be made from aluminum, for example. The sides 16 of each leg are provided with a plurality of holes 25 to adjust the lower leg members 40, 40', 40'', and 40'''. Pins 42 will secure the members 40, 40', 40'', and 40''' in position.

The detachable step 20 shown in FIGS. 1 and 2 comprises a transverse rung 22 having a pair of vertical channel members 24 and 24' attached near each end of the rung 22. The channel members 24 and 24' have a generally flat inner facing 26 and parallel side members 28 and 28'. The detachable step 20 is fastened to the leg members 40, 40', 40'', and 40''' of an adjustable saw horse by drop pin 50 shown in FIGS. 1, 3, **4*a*, and 4*b***.

The present new and improved detachable step 20 for a saw horse 10 can be easily assembled and disassembled without the use of tools. The step comprises a transverse rung 22 disposed between a pair of perpendicular support members or channel members 24 and 24'. A pin may be attached to the saw horse or the step for fastening or removably fixing the step to a side rail of the saw horse.

This invention is an inexpensive yet strong and easily detachable step means for use with a saw horse. The step is vertically adjustable relative to the vertically adjustable saw horse leg members. The steps 20 are made from aluminum, for example. The step is easily detachable from the saw horse by a moveable drop pin 50. The step can be removeably affixed to the saw horse without using tools.

The drop pin is shown in FIGS. 1, 2, **4*a*, and 4*b*. The pin 50 has a shaft 60, a rear handle or stop 62 and a drop pin 64. The pin is moveable downward by gravity from the position shown in FIG. 4*a* to the position shown in FIG. 4*b*. Shaft 66 secures the drop pin 64 in cavity 68. In use, the drop pin 50 is pushed through holes 70, 70', 72 and 72' in each channel member and each leg member respectively as shown in FIG. 4*b*. After moving the shaft 60 through hole 70' and having the handle or stop 62 engage channel member 24, the drop pin 64 will move from the position shown in FIG. 4*a* to that shown in FIG. 4*b*. The drop pin 50 may be removed by pushing the pin 64 up into the cavity 68 and rotating the handle 62 ninety degrees or more to hold the drop pin in the cavity and then withdrawing the pin from holes 70, 70', 72, and 72'**.

In FIGS. 5 and 6, along the top of the channel member 24 is a curved pin 30 having the general shape of a reversed "L". The curved pin 30' is inserted through holes 25 for supporting the step at different vertical heights.

As illustrated in FIGS. 4 and 5, the inner facing 26 is disposed against and supported by the front face 18 of the saw horse legs 14, when the pin 30 is inserted into a hole 25. It will also be seen that the side members 28 and 28' are disposed against side faces 16' for lateral support.

The reversed "L" shaped pin 30 when inserted through a hole 25 has the vertical portion 31 positioned against the inside of the channel leg 14. Thus, the step 20 is rigidly held against the legs and resists movement in any direction when the step has a load on it.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A step structure for attachment to a saw horse having a pair of support legs each in the form of a channel member which includes a front wall with a plurality of openings spaced along the length thereof and a pair of sides projecting from the front wall, said step structure comprising:

a rigid rung;

a pair of support brackets on opposite end portions of said rung, each support bracket being in the form of a channel having a front wall and a pair of sides engagable with the front wall and sides of the corresponding support leg when said brackets are applied to said legs; and a pin secured to said front wall of each support bracket and projecting above said front wall, said pins being insertable in each of the openings of the support legs to fasten the rung in extension between said support legs at a plurality of elevations, each pin having an L shaped configuration and presenting a horizontal portion extending through the opening and a vertical portion engaging a back surface of the front wall of the support leg to maintain the brackets on said support legs.

* * * * *